United States Patent [19]
Santa-Maria

[11] 3,713,058
[45] Jan. 23, 1973

[54] CONTROLLED CHANGE-OVER SUPER CONDUCTIVE SWITCH

[75] Inventor: Enrique Santa-Maria, Villiers-sur-Orge, France

[73] Assignee: Compagnie Generale D'Electricite, Paris, France

[22] Filed: Jan. 6, 1972

[21] Appl. No.: 215,717

[30] Foreign Application Priority Data

Jan. 7, 1971 France ................................7100377

[52] U.S. Cl. ................................335/216, 200/166 C
[51] Int. Cl. ................................H01f 7/22
[58] Field of Search ..................335/216; 336/DIG. 1; 200/166 C

[56] References Cited

UNITED STATES PATENTS

| | | | |
|---|---|---|---|
| 3,255,335 | 6/1966 | Kortelink | 200/166 C |
| 3,479,569 | 11/1969 | Prost et al. | 335/216 X |
| 3,513,421 | 5/1970 | Schindler et al. | 335/216 |

*Primary Examiner*—George Harris
*Attorney*—Richard C. Sughrue et al.

[57] ABSTRACT

A device obtains resistance response curves of a switch as a function of time according to laws defined in advance, comprising a superconducting main winding and control windings wound in a particular way.

4 Claims, 5 Drawing Figures

PATENTED JAN 23 1973 3,713,058

CONTROLLED CHANGE-OVER SUPER CONDUCTIVE SWITCH

BACKGROUND OF THE INVENTION

1. Field of the Invention

The present invention concerns a superconductive switch in which the change-over from the superconductive state to the normal state obeys a pre-determined law.

2. Description of the Prior Art

It is known to arrange a superconductive switch at the terminals of a superconductive storage winding. This switch is then used for controlling the charging, storage and discharging of the storage winding in which energy is stored in magnetic form. During the charging phase, the switch must have a resistance with a high value in order to make the circuit resemble an open one as much as possible. During the storage phase, the switch must be closed in order to short-circuit the winding, this being effected by making it assume a resistance which is as near as possible to zero resistance. During the discharging phase, the switch must have a very high resistance in order to effect the transfer of power towards the load devices. It is known that the changing over of the switch from the closed state to the open state is effected by means of a magnetic or thermal control which makes the switch change over from the superconductive state to the normal state. The resistance assumed by the switch is zero in the superconductive state; this state remains unchanged up to a first lower critical magnetic field and/or a lower critical temperature. For higher magnetic fields or temperatures corresponding to a combined superconductive-normal state, this resistance increases up to a certain higher critical magnetic field or a higher critical temperature. For values greater than one or the other of these values, the resistance set up in the switch which has become completely normal is then very great and constant. During passing through the combined state, the form of variation of the rise in resistance as a function of time is imposed by the form of variation as a function of time of the current setting up the magnetic or thermal control.

Either this current varies linearly in the form of a gradient when the voltage which gave rise to it is constant, or it has a decreasing exponential form with a convexity facing upwards when it is set up by the discharging of capacitors. Consequently, during passing through the combined state, the resistance set up in the switch as a function of time complies with similar response -- either a gradient or an exponential arch.

The variation of the resistance during the changeover from the superconductive state to the normal state is invariably fixed and cannot be greatly changed.

Usual switches have the disadvantage of producing appreciable over-voltages within the storage winding, subsequent to the particular shape of that response curve.

SUMMARY OF THE INVENTION

The device according to the present invention overcomes that disadvantage. Indeed, in the latter, it is possible to obtain switch resistance response curves as a function of time according to pre-determined laws.

The invention has for its object a superconductive switch arranged at the terminals of a superconductive storage winding, this switch comprising a main superconductive winding wound round an axis of symmetry and, in the vicinity of the said main winding, magnetic control windings would round the same axis, suitable for making the main winding change over to the normal state, characterized in that at least one of the said main and control windings consists of turns having a variable radius and whose number, for turns having the same center on the said axis, increases from one end of the winding to the other.

BRIEF DESCRIPTION OF THE DRAWINGS

With reference to the accompanying diagrammatic FIGS. 1 to 5, an example of the implementing of the present invention will be described hereafter, this example being given only by way of illustration and having no limiting character. The same elements shown in several of these figures bear in all these latter, the same references.

DESCRIPTION OF THE PREFERRED EMBODIMENT

Figure 1:
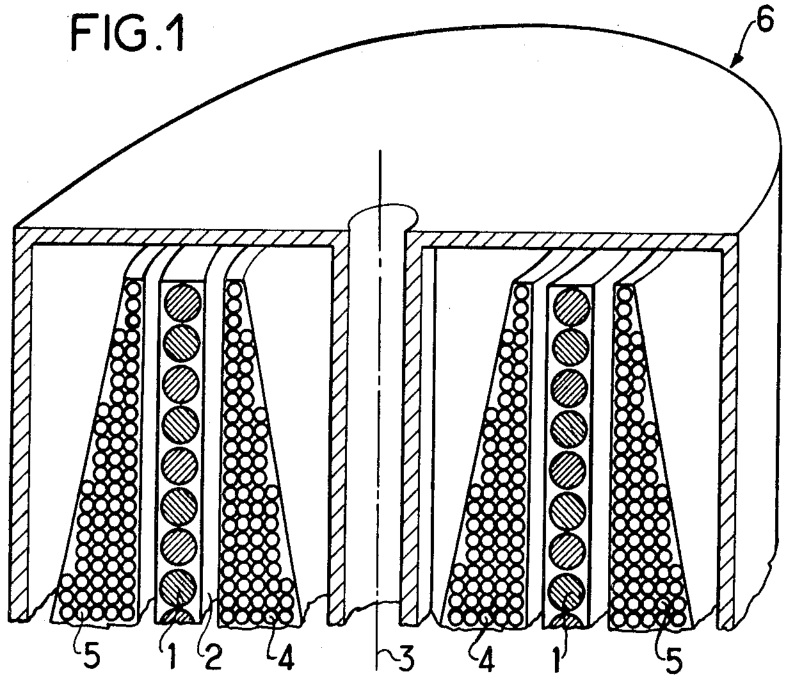
FIG. 1 shows diagrammatically, a partial sectional perspective view of a fragment of the switch in one embodiment.
Figure 2:
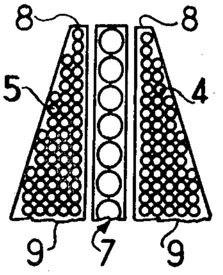
FIG. 2 shows diagrammatically, a sectional view of the main and control windings of the switch in the same embodiment as in FIG. 1.

FIGS. 1 and 2 show a main winding 1 wound around a cylindrical frame 2 about an axis 3.

The main winding 1 is made of superconductive material having zero electrical resistance below a lower critical temperature and magnetic field. A bath of cryogenic fluid (not shown) such as liquid helium surrounds the main winding 1 so as to bring it to the superconductive state.

The main winding 1 consists of multi-strand cables made of niobium-titanium alloy containing 40 percent of titanium, for example. In a varied version, a niobium-zirconium alloy or a compound of niobium and tin in the form of a single wire or tape could be used. An internal control winding 4 and an external control winding 5 wound round the same axis 3 are arranged on both sides of the main winding 1. The magnetic control winding is made of non-superconductive metal such as copper.

A discharge from a battery of capacitors in the two control windings is apt to cause the setting up of an armature current which sets up a magnetic field sufficient to bring the main winding into the normal state. The assembly formed by the main winding 1 and the two control windings is contained in a cylinder 6 closed at its two bases and acting as a magnetic screen.

The cylinder 6 is made of copper or any other metal which is a good conductor of electricity.

FIG. 2 shows the embodiment of the main winding 1 and control windings 4 and 5. The main winding 1 has turns regularly spaced about the axis 3. The axial sectional view of the cylindrical lateral surface formed by the turns makes it possible to see that the turns of the winding 1 are arranged inside an elongated rectangle 7. The control windings 4 and 5 are spaced irregularly round the axis 3. At one end 8 perpendicular to the rectangle 7, the control windings 4 and 5 comprise a restricted number of turns, for example, a single layer of turns, whereas at the other end 9, the turns are wound onto one another so as to form a great number of layers. Between the two ends 8 and 9, the layers are spaced out in decreasing numbers so that their outer casing forming the lateral surface of a truncated cone forms a cross-section of the edge of that surface like the hypotenuse of a right-angled triangle. Since the end 9 comprises more turns than the end 8, the magnetic field set up at the instant of the control is greater in the vicinity of the end 9 than in the vicinity of the end 8. The critical magnetic field is not reached at the same instant in all the areas of the superconductive material. Consequently, the change-over from the superconductive state to the normal state does not occur at the same time in the main winding 1.

Figure 3:
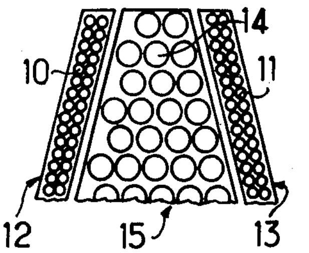
FIG. 3 shows diagrammatically, a sectional view of the main and control windings of a switch in a varied version.

FIG. 3 shows a sectional view identical to that in FIG. 2. The control windings 10 and 11 are spaced regularly in relation to their winding axis 3. The thickness of the layers is even. According to that sectional view, the control windings 10 and 11 are contained inside the parallelograms 12 and 13 and the main winding 14 is contained inside a trapezium 15. The control windings 10 and 11 are equidistant from the peripheral layers of the main winding 14. In that case, subsequent to the variable quantity of superconductive material subjected to the magnetic field, the gradient of the quantity of material is variable as a function of the magnetic field, and also of time. On the large base side of the trapezium 15, there is a greater quantity of superconductive material for changing over to the normal state in a given time than on the small base side of that trapezium.

Figure 4:
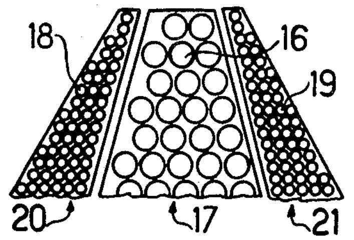
FIG. 4 shows diagrammatically, a sectional view of the main and control windings of a switch in a third varied version.

FIG. 4 shows a combination of the two devices embodied in the preceding figures. A variation of the control and of the superconductive material constituting the main winding is made. According to a sectional view identical to that in FIGS. 2 and 3, the main winding 16 is contained in a trapezium 17 and the control windings 18 and 19 are contained in triangles 20 and 21. One of the sides of the obtuse angle in the triangles 20 and 21 is parallel to one of the non parallel sides of the trapezium 17.

When an electrical discharge pulse is sent to the control windings 18 and 19, the magnetic field is stronger on the large base side of the trapezium 17 and it affects, at that point, the greatest quantity of superconductive material.

Figure 5:
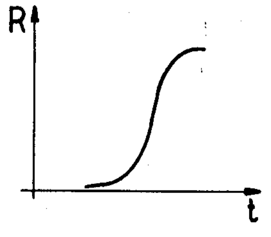
FIG. 5 shows a diagrammatic curve describing the resistance of the superconductive material as a function of time, obtained with the device according to the invention.

FIG. 5 shows the effect which can be obtained by modifying the structure of the windings of a switch. During the change-over to the normal state, the resistance set up by the switch as a function of time follows, firstly, a gentle slope, before following a steep slope. This enables, more particularly, the avoidance of over-voltages in the case of discharging by a transformer in which the primary winding is controlled by the switch produced according to the invention. Indeed, the slow action at the beginning of the change-over enables the leakage choke of the transformer to discharge elsewhere than into the switch.

Although the device which has just been described appears to be of the greatest advantage, it will be understood that various modifications can be made thereto without going beyond the scope of the invention, it being possible to replace certain elements in the device by others capable of fulfilling the same technical function therein.

The device which is the object of the invention can be used in all cases where the change-over from the superconductive state to the normal state is to be obtained according to a previously determined law. It can be used more particularly for reducing the over-voltages in a superconductive transformer or for obtaining the amplification of a power pulse whose form is similar to the control pulse.

Particularly interesting applications can be found for it in the branch of high power storage and release.

What is claimed is:

1. In a superconductive switch for use at the terminals of a superconductive storage winding; said switch comprising: a main superconductive winding wound round an axis of symmetry and, in the vicinity of the said main winding, magnetic control windings wound around the same axis for making the said main winding change over to a normal state, the improvement wherein: at least one of the said main and control windings consists of turns having a variable radius and whose number of turns centered on the said axis, increases from one end to the other.

2. The switch according to claim 1, wherein: a section passing through the said axis of symmetry has the cross-sections of the turns of the said main winding contained in a rectangle having a small side perpendicular to said axis of symmetry which is arranged on the outside of the said rectangle, and the cross-sections of the turns of said control windings contained in two right-angled triangles whose right-angle has one of its sides parallel to the large side of said rectangle.

3. The switch according to claim 1, wherein: a section passing through the said axis of symmetry has the cross-sections of the turns of said main winding contained in an isosceles trapezium whose bases are perpendicular to said axis of symmetry, which is arranged on the outside of the said trapezium, and the cross-sections of the turns of said control windings contained in two parallelograms one of whose large sides is parallel to one of the non parallel sides of said trapezium.

4. The switch according to claim 1, wherein: a section passing through the said axis of symmetry has the cross-sections of the turns of the said main winding contained in an isoceles trapezium having a base perpendicular to said axis of symmetry, which is arranged outside the said trapezium and the cross-sections of the turns of said control windings contained in two triangles whose obtuse angle has one of its sides parallel to one of the non parallel sides of said trapezium.

* * * * *